United States Patent
Ito et al.

(10) Patent No.: US 7,171,889 B2
(45) Date of Patent: Feb. 6, 2007

(54) SWASH PLATE TILTING ANGLE DETECTOR FOR A SWASH PLATE PLUNGER TYPE HYDRAULIC UNIT

(75) Inventors: Katsuhiko Ito, Saitama (JP); Yasushi Fujimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 10/801,932

(22) Filed: Mar. 16, 2004

(65) Prior Publication Data
US 2004/0187676 A1 Sep. 30, 2004

(30) Foreign Application Priority Data
Mar. 31, 2003 (JP) .............................. 2003-096868

(51) Int. Cl.
*F01B 3/02* (2006.01)
*F01B 31/12* (2006.01)
(52) U.S. Cl. ........................................ 92/5 R; 92/12.2
(58) Field of Classification Search ................ 92/5 R; 464/110
See application file for complete search history.

(56) References Cited

U.S. PATENT DOCUMENTS 3,469,416 A * 9/1969 Snyder ........................ 464/110
4,536,130 A * 8/1985 Orlando et al. ................ 92/33
4,916,901 A * 4/1990 Hayashi et al. ............... 60/489

FOREIGN PATENT DOCUMENTS

| JP | 63140163 | 6/1988 |
| JP | 06002753 | 1/1994 |
| JP | 2001343060 | 12/2001 |

OTHER PUBLICATIONS

Machine Design Massachusetts, Addison-Wesley Publishing Company, 1976 pp. 167-168.*

* cited by examiner

*Primary Examiner*—F. Daniel Lopez
(74) *Attorney, Agent, or Firm*—Carrier, Blackman & Associates, P.C.; William D. Blackman; Joseph P. Carrier

(57) ABSTRACT

A swash plate plunger type hydraulic motor is constituted such that plungers are slidably disposed in respective plunger holes of a motor cylinder, and a motor rolling member having a motor swash plate member is supported in a motor casing in such a manner that it can tilt and roll. A swash plate tilting angle detector for detecting the angle of a swash plate includes an angle detector mounted to a transmission housing and a rotation connection mechanism for connecting the motor rolling member to the angle detector. The rotation connection mechanism includes a first connection rod which is connected to the motor rolling member coaxially to its tilting and rolling axis, a second connection rod connected to the angle detector, and a movable or universal joint for connecting the first connection rod to the second connection rod. The described motor provides a swash plate tilting angle detector which has a high degree of freedom of installation position and permits the displacement of the center position thereof without affecting detection accuracy.

14 Claims, 9 Drawing Sheets

SWASH PLATE TILTING ANGLE DETECTOR FOR A SWASH PLATE PLUNGER TYPE HYDRAULIC UNIT

CROSS-REFERENCE TO RELATED APPLICATIONS

The present invention claims priority under 35 USC 119 based on Japanese patent application No. 2003-096868, filed Mar. 31, 2003.

BACKGROUND OF THE INVENTION

1. Field of the Invention

The present invention relates to a swash plate tilting angle detector. More particularly, the present invention relates to a swash plate tilting angle detector for detecting the tilting and rolling angle of a swash plate in a swash plate plunger type hydraulic unit such as a swash plate plunger pump or swash plate plunger motor.

2. Description of the Background Art

Until recently, various types of hydraulic continuously variable transmissions each comprising a combination of a hydraulic pump and a hydraulic motor have been known and implemented. For example, hydraulic continuously variable transmissions disclosed in JP-A 6-2753 and JP-B 7-88884 are proposed by the applicant of the present application. Each of the hydraulic continuously variable transmissions disclosed by these patent documents comprises a swash plate plunger pump, a swash plate plunger motor and a hydraulic closing circuit for connecting the outlet port and inlet port of the swash plate plunger pump to the inlet port and outlet port of the swash plate plunger motor, respectively, wherein a pump swash plate member is driven by an engine, a pump cylinder and a motor cylinder are connected to each other above the output shaft of the engine, the rotation of a motor swash plate member is restricted, and the angle of a motor swash plate can be changed.

In this hydraulic continuously variable transmission, a pump cylinder and a motor cylinder are connected to each other back to back, and pump and motor distributor valves (distributor valves) are arranged in this connection portion to constitute a closed hydraulic circuit. The pump and motor distributor valves supply oil discharged from pump plungers which are reciprocated in the pump cylinder by the revolution of a pump swash plate to be driven into a motor cylinder chamber to push motor plungers so that they are moved in an axial direction in sliding contact with a motor swash plate to drive the motor cylinder.

By changing the angle of the motor swash plate, the reciprocating strokes of the motor plungers, that is, the motor capacity is changed continuously to vary the revolution speed of the motor cylinder continuously. When this speed change control is carried out, the angle of the motor swash plate is detected, and the control of the operation of a motor servo mechanism for controlling the angle of the motor swash plate is based on detection information on the angle of the motor swash plate. Therefore, the detection of the angle of the motor swash plate is necessary. For example, JP-A 2001-343060 discloses that the rotation angle of a swash plate holder is detected by mounting a ratio detection sensor, which is a potentiometer, to a casing.

The above known ratio detection sensor, that is, a swash plate angle detector is mounted to a transmission housing, and a revolution detection axis extending from this detector is secured to the swash plate holder (swash plate rolling member) to transmit the revolution of the swash plate holder turned by the tilting and rolling of the swash plate to the revolution detection axis as the tilting angle of the swash plate. However, as the swash plate angle detector is mounted to the casing, the center of rolling of the swash plate rolling member supported by the casing and the center of the revolution detection axis of the swash plate angle detector may slightly differ from each other. The revolution detection axis is mounted at an angle, accurate angle detection may not be carried out, and a detection error may occur. Therefore, it is necessary to prevent the above difference.

In other words, the swash plate angle detector must be mounted to the casing such that the revolution detection axis of the swash plate angle detector becomes coaxial to the center of rolling of the swash plate rolling member. As a result, the installation position and the installation angle of the swash plate angle detector are limited, thereby reducing the degree of lay-out freedom. That is, to carry out the optimum lay-out of the device, the installation of the swash plate angle detector must be taken into consideration for the lay-out and the degree of lay-out freedom is low.

Although the known devices have utility for their intended purposes, there is still a need to provide an improved swash plate tilting angle detector with greater lay-out freedom.

SUMMARY OF THE INVENTION

In view of the above disadvantage of known systems, it is an object of the present invention to provide a swash plate tilting angle detector for a swash plate plunger type hydraulic unit, which can eliminate the conventional necessity of great control for securing the detection accuracy of the swash plate angle detector and can make it easy to control the installation position.

To attain the above object, according to the present invention, there is provided a swash plate plunger type hydraulic unit comprising a cylinder which is rotatably supported and has a plurality of plunger holes extending in an axial direction and arranged in a loop to surround a rotation axis thereof, a plurality of plungers slidably disposed in the respective plunger holes, a swash plate (for example, motor swash plate 31 and motor rolling member 35 in the Embodiment disclosed below) to which the outer end portions of the plungers are contacted, and a casing supporting the swash plate in such a manner that it can tilt and roll with a rolling axis perpendicular to the rotation axis as a center, and housing the swash plate and the cylinder. A swash plate tilting angle detector detecting the tilting and rolling angle of the swash plate comprises an angle detector mounted to the casing and a rotation connection mechanism having one end which is situated coaxial to the rolling axis and connected to the swash plate and another end which is connected to the angle detector, and the rotation connection mechanism accurately transmits the rolling angle of the swash plate to the angle detector even when a rotation axis of a portion of the angle detector connected to the rotation connection mechanism is inclined at an angle with respect to the rolling axis.

Preferably, the rotation connection mechanism comprises a first connection rod connected to the swash plate coaxially to the rolling axis, a second connection rod connected to a rotation detector and a movable joint for connecting the first connection rod to the second connection rod.

According to the swash plate tilting angle detector for a swash plate plunger type hydraulic unit constituted as described above, the angle detector mounted to the casing and the swash plate are connected to each other by the rotation connection mechanism (for example, the rotation connection mechanism having a universal joint) which can transmit the tilting and rolling angle of the rotation detection axis relative to the angle detector accurately even when the rotation detection axis of the angle detector is inclined at a predetermined angle with respect to the axis of the swash plate. Therefore, even when the center of rolling of the swash plate and the center of the rotation detection axis of the swash plate angle detector slightly differ from each other, the tilting and rolling angle of the swash plate is transmitted to the angle detector by the rotation connection mechanism accurately to detect the accurate angle of the swash plate. Accordingly, the conventional necessity of great control for securing the detection accuracy of the swash plate angle detector is eliminated and it is easy to control the installation position of the detector.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 1:
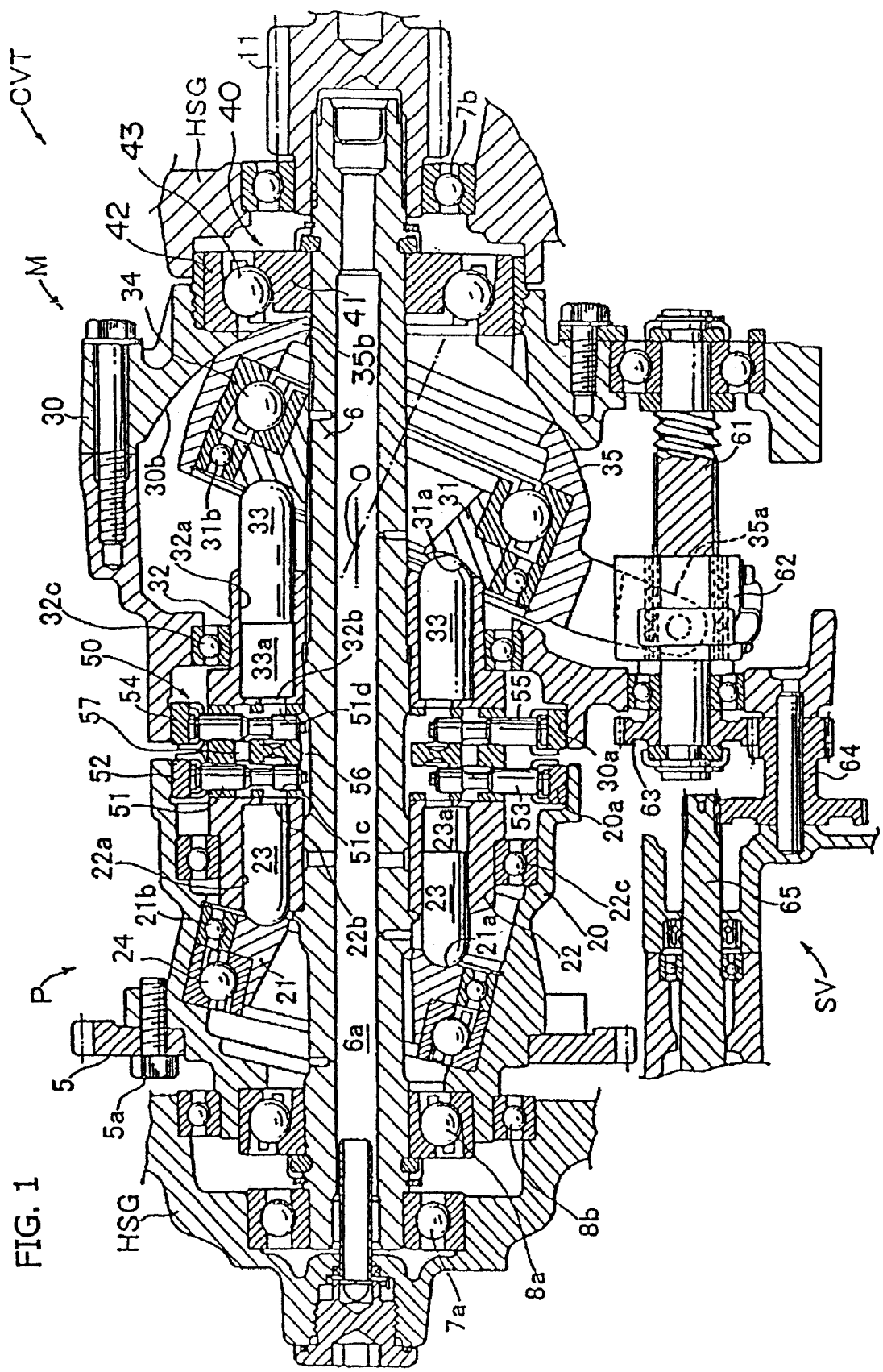
FIG. 1 is a sectional view of a hydraulic continuously variable transmission having a swash plate tilting angle detector according to an illustrative embodiment of the present invention.
Figure 2:
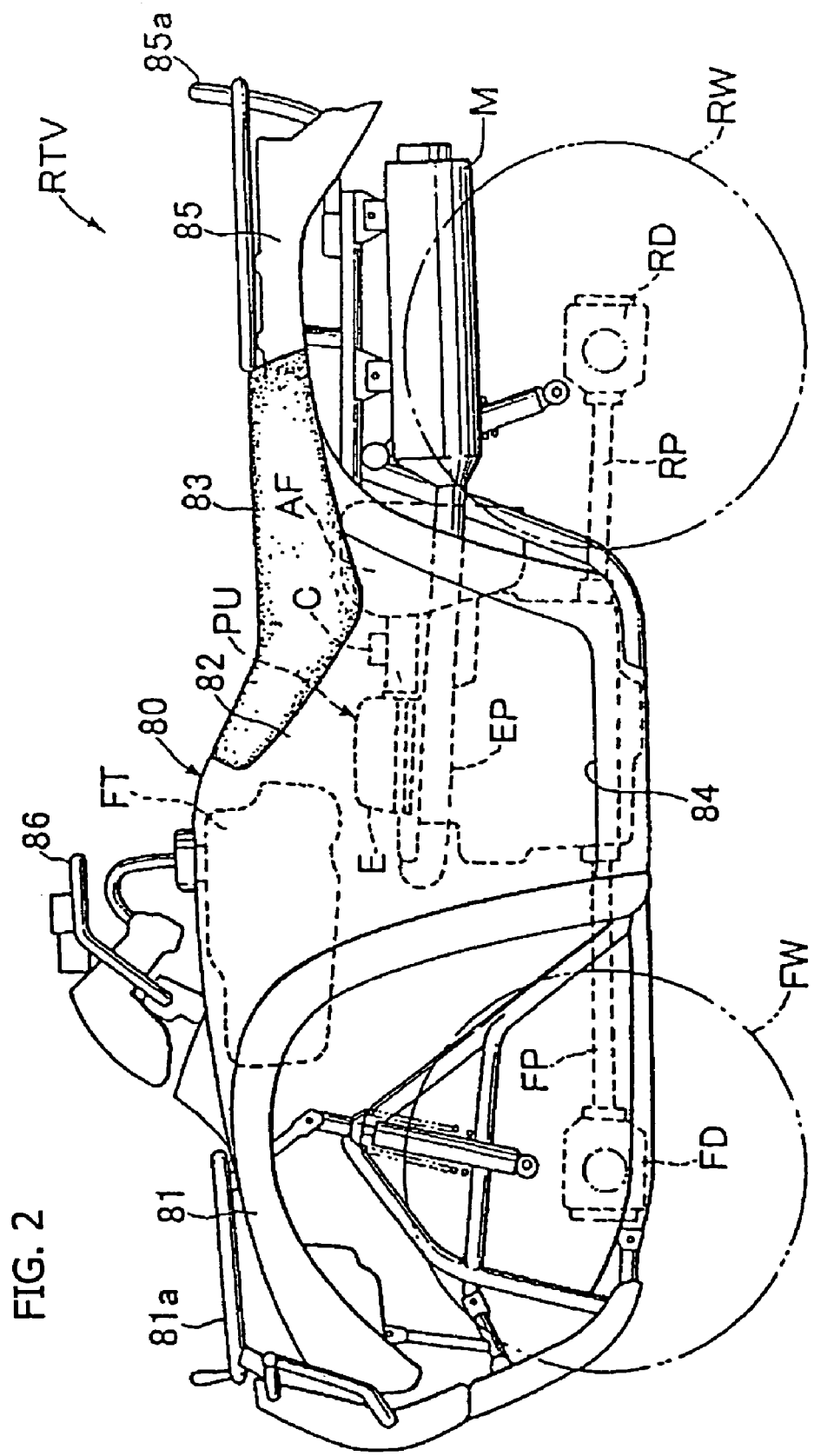
FIG. 2 is a side view of a rough or all terrain vehicle having the above hydraulic continuously variable transmission according to an embodiment of the present invention.
Figure 3:
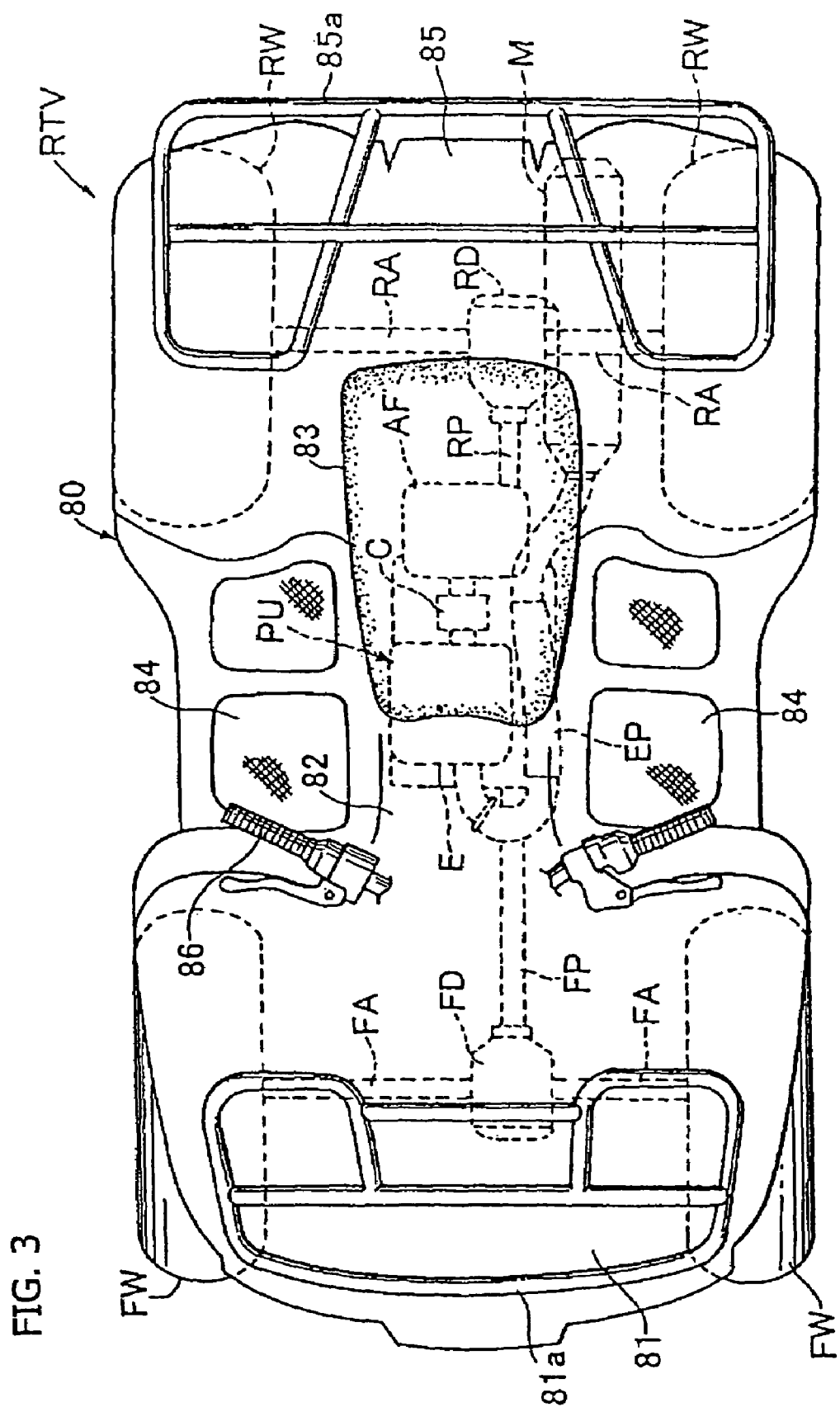
FIG. 3 is a plan view of the rough terrain vehicle having the above hydraulic continuously variable transmission according to an embodiment of the present invention.
Figure 4:
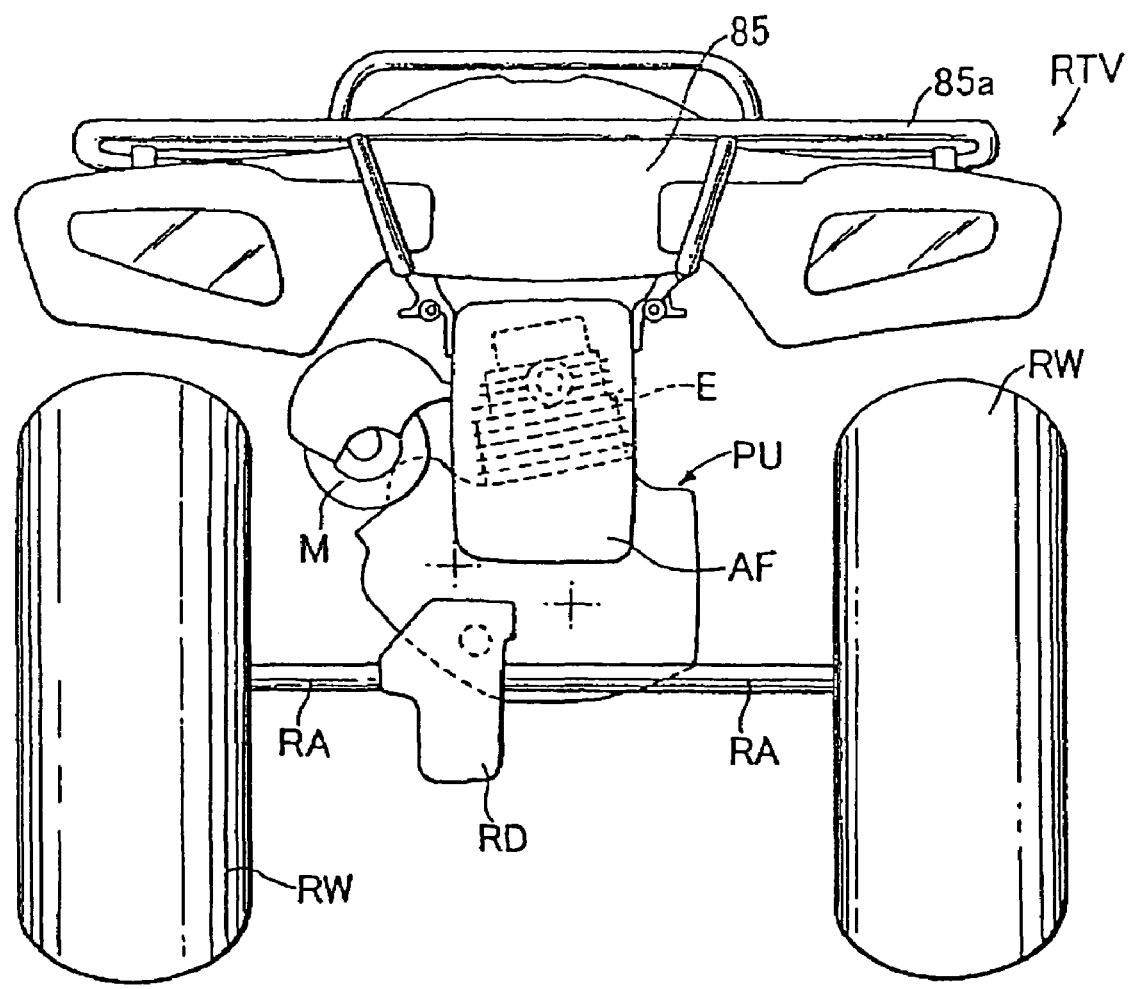
FIG. 4 is a rear view of the rough terrain vehicle having the above hydraulic continuously variable transmission according to an embodiment of the present invention.

One illustrative embodiment of the present invention will be described hereinbelow with reference to the drawings. First, FIGS. 2 to 4 show a rough or all terrain vehicle (RTV) which has a hydraulic continuously variable transmission provided with the swash plate tilting angle detector of the present invention. This vehicle (RTV) incorporates a power unit (PU) in a car body 80 having a frame structure therein and has front wheels (FW) and rear wheels (RW) which are driven by the output of the power unit (PU). The car body 80 comprises a front fender 81 situated at the front of the car body and provided with a front guard 81a, a saddle 82 which extends longitudinally and projects upward from the center of the car body, right and left steps 84 and 84 which extend downward from the right and left sides of the saddle 82 in right and left directions, and a rear fender 85 situated at the rear of the car body and provided with a rear guard 85a. The saddle 82 is provided with a seat 83 for a driver. The driver who strides over the saddle 82 to sit on the seat 83 puts his/her feet on the right and left steps 84 and manipulates a steering handle 86 which is situated in front of him/her and can be turned in right and left directions. A fuel tank (FT) is arranged in front of the saddle 82 as shown in FIG. 1.

Figure 5:
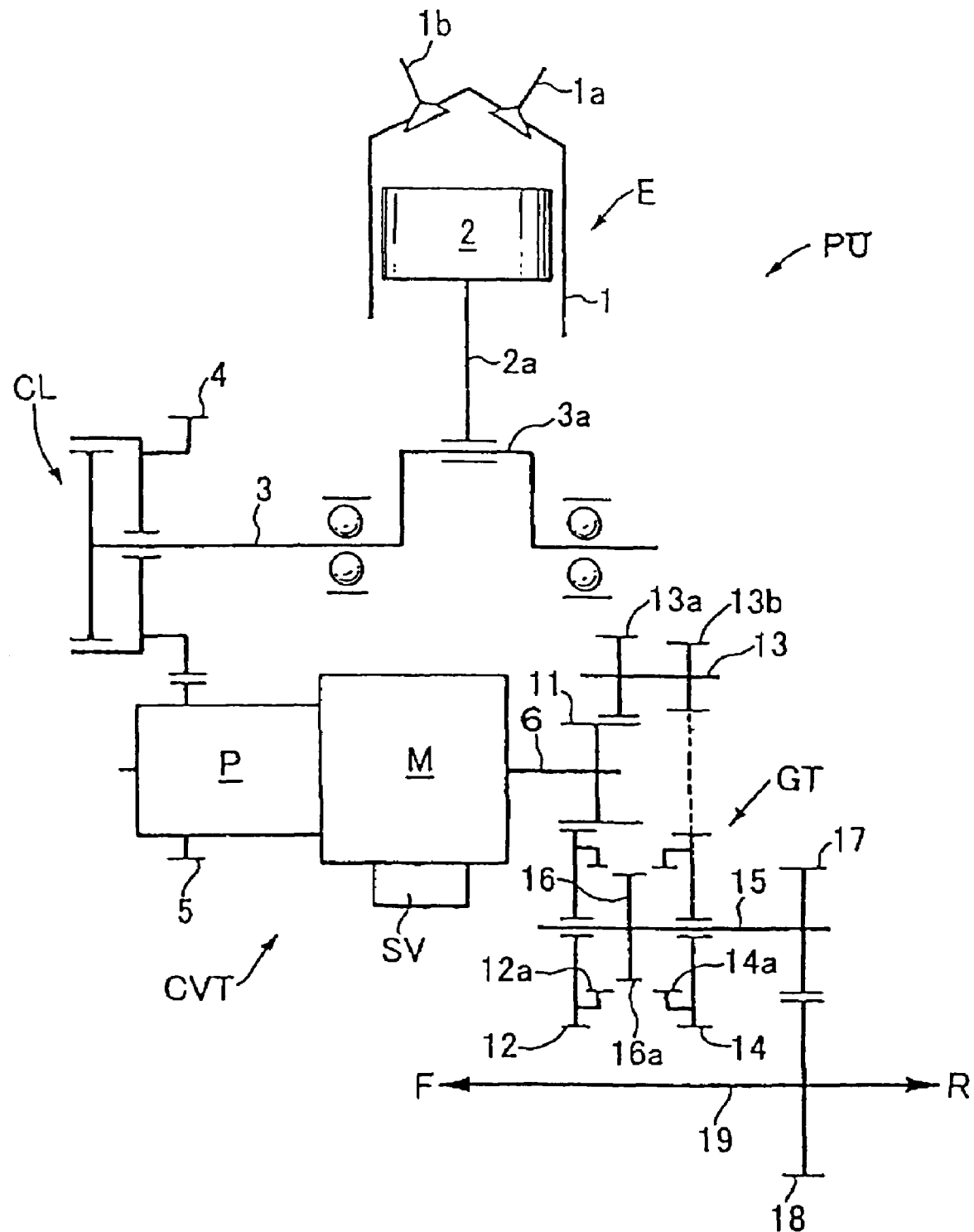
FIG. 5 is a schematic diagram showing the power transmission line of a power unit having the above hydraulic continuously variable transmission according to an embodiment of the present invention.
Figure 6:
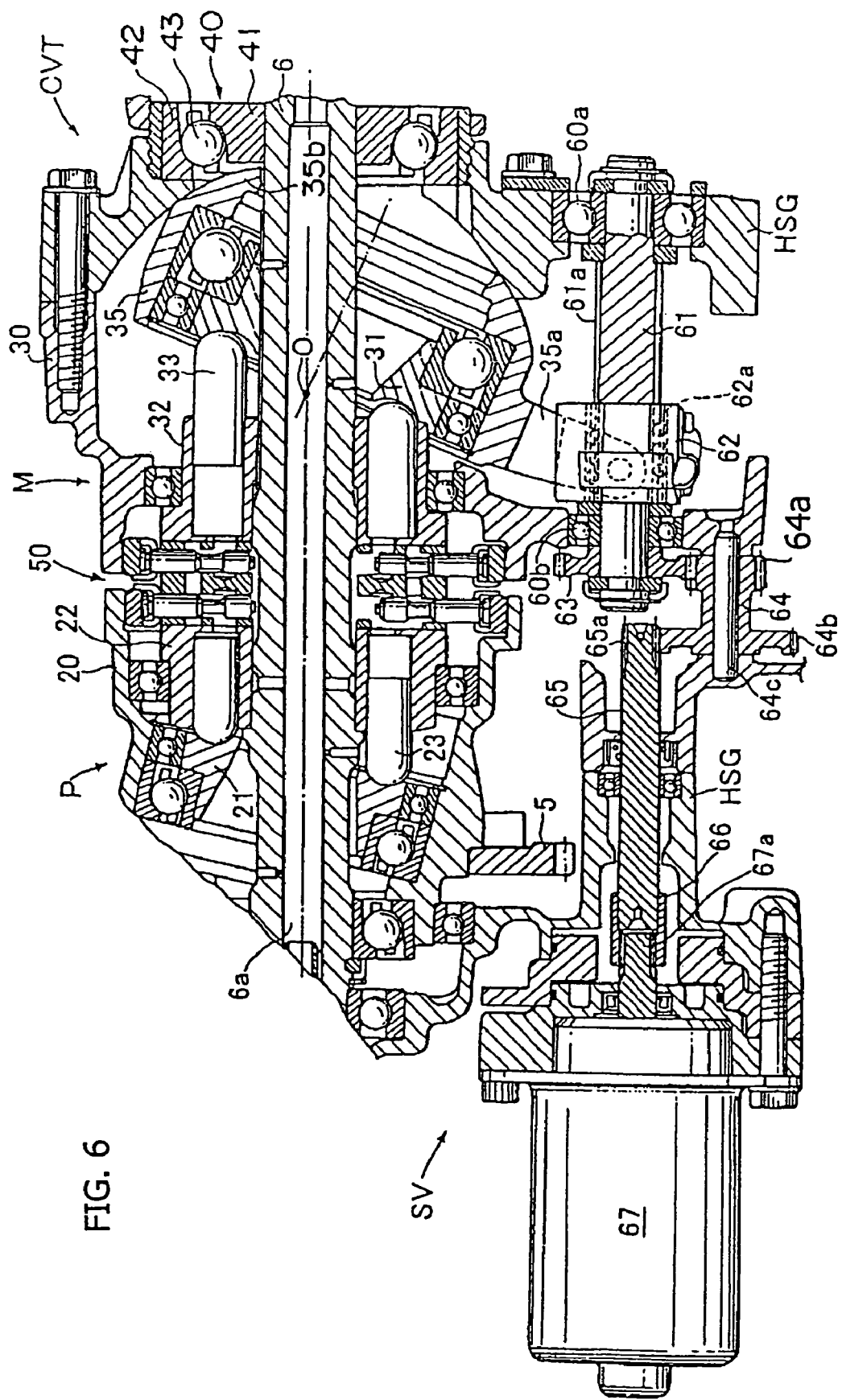
FIG. 6 is a sectional view of part of the above hydraulic continuously variable transmission according to an embodiment of the present invention.

The saddle 82 incorporates the power unit (PU) which comprises an engine (E), main clutch (CL), hydraulic continuously variable transmission (CVT) and transmission gear train (GT) as will be described hereinafter with reference to FIG. 5. The engine (E) takes in an air-fuel mixture prepared by mixing together air absorbed through an air filter (AF) and fuel in the fuel tank (FT) in a carburetor (C) and burns it in a cylinder to generate driving torque. An exhaust gas which is produced after burning in the cylinder is discharged from an exhaust pipe (EP) through a muffler (M).

The driving torque of the engine (E) is transmitted from the crank shaft to the main clutch (CL), hydraulic continuously variable transmission (CVT) and transmission gear train (GT) while its speed is changed and output to front and rear propeller shafts (FP, RP). The front propeller shaft (FP) is connected to a front differential mechanism (FD) so that the driving torque output to the front propeller shaft (FP) is transmitted from the front differential mechanism (FD) to the right and left front wheels (FW) through right and left front axle shafts (FA) so as to drive the front wheels (FW). The rear propeller shaft (RP) is connected to a rear differential mechanism (RD) so that the driving torque output to the rear propeller shaft (RP) is transmitted from the rear differential mechanism (RD) to the right and left rear wheels (RW) through right and left rear axle shafts (RA) so as to drive the rear wheels (RW).

A description is subsequently given of the above power unit (PU) with reference to FIG. 5. The power unit (PU) comprises the engine (E) for generating driving torque, the main clutch (CL) for controlling the transmission of the driving torque, the hydraulic continuously variable transmission (CVT) for changing the driving torque transmitted through the main clutch (CL) continuously, and the transmission gear train (GT) for changing the direction of and transmitting the output revolution of the hydraulic continuously variable transmission (CVT). The power unit (PU) is incorporated in the saddle 82 in such a manner that the engine crank shaft extends in the longitudinal direction of the car body.

The engine (E) is provided with a piston 2 in a cylinder 1 having feed and exhaust valves 1a and 1b in its head portion. In the engine (E), air absorbed through the air filter (AF) is mixed with fuel in the fuel tank (FT) in the carburetor (C) to prepare an air-fuel mixture as described above, the air-fuel mixture is supplied into the cylinder chamber by opening the feed valve 1a at a predetermined timing and burnt in the cylinder chamber to reciprocate the piston 2, this reciprocation of the piston 2 is transmitted to a crank 3a by a connection rod 2a, and a crank shaft 3 is turned. The main clutch (CL) is provided at the end of the crank shaft 3 to control engagement/disengagement between an input drive gear 4 rotatably installed on the crank shaft 3 and the crank shaft 3. Therefore, the driving torque of the crank shaft 3 is transmitted to the input drive gear 4 in accordance with the control of engagement/disengagement by the main clutch (CL). The main clutch (CL) is composed of a centrifugal clutch, for example.

The hydraulic continuously variable transmission (CVT) has a swash plate plunger type hydraulic pump (P) and a swash plate plunger type hydraulic motor (M). An input slave gear 5 connected to a pump casing constituting the swash plate plunger type hydraulic pump (P) engages with the above input drive gear 4 so that the driving torque of the engine (E) is transmitted to the input slave gear 5 to turn the pump casing. The output revolution whose speed has been changed continuously by the hydraulic continuously variable transmission (CVT) to be described in detail hereinafter is output to a transmission output shaft 6.

The transmission output shaft 6 is connected to a transmission output gear 11 constituting the above transmission gear train (GT) to transmit the revolution of the transmission output shaft 6 from the transmission output gear 11 through the transmission gear train (GT). The transmission gear train (GT) has a counter shaft 15 and an idler shaft 13 arranged parallel to the transmission output shaft 6. The counter shaft 15 is fitted with a forward gear 12 and a backward gear 14 in such a manner that they can turn freely, and connected to an output drive gear 17. Meanwhile, the idler shaft 13 is connected to a first idler gear 13a and a second idler gear 13b. The forward gear 12 engages with the transmission output gear 11, and the first idler gear 13a also engages with the transmission output gear 11. The second idler gear 13b engages with the backward gear 14.

The forward gear 12 and the backward gear 14 are provided with internal clutch gears 12a and 14a, respectively, and a clutch sleeve 16 which can turn together with the counter shaft 15 to be moved in an axial direction is provided between the forward gear 12 and the backward gear 14. An external clutch gear 16a is formed on the clutch sleeve 16 to move the clutch sleeve 16 in the axial direction to be selectively engaged with the internal clutch gear 12a or 14a, thereby constituting a dog clutch. This clutch sleeve 16 is moved in the axial direction by the driver's manipulation of a shift lever to a forward movement side or backward movement side.

When the driver moves the shift lever to the forward movement side, the clutch sleeve 16 is moved in the left direction in the figure, and the external clutch gear 16a is engaged with the internal clutch gear 12a to connect the forward gear 12 to the counter shaft 15. Therefore, in this state, the revolution of the transmission output gear 11 is transmitted from the forward gear 12 to the counter shaft 15 to turn the output drive gear 17.

When the driver moves the shift lever to the backward movement side, the clutch sleeve 16 is moved in the right direction in the figure, and the external clutch gear 16a is engaged with the internal clutch gear 14a to connect the backward gear 14 to the counter shaft 15. In this state, the revolution of the transmission output gear 11 is transmitted from the first idler gear 13a to the second idler gear 13b through the idler shaft 13 and further from the second idler gear 13b to the counter shaft 15 through the backward gear 14 engaged with the second idler gear 13b to turn the output drive gear 17. The revolution direction of the output drive gear 17 at this point is the opposite direction (backward direction) to the direction when the shift lever is moved to the above forward movement side.

The output drive gear 17 engages with the output slave gear 18 connected to a drive shaft 19 so that the revolution of the output drive gear 17 is transmitted to the drive shaft 19 through the output slave gear 18. The front end of the drive shaft 19 is linked to the front propeller shaft (FP) and the rear end of the drive shaft 19 is linked to the rear propeller shaft (RP) so that the driving torque transmitted to the drive shaft 19 is transmitted to the front and rear propeller shafts (FP, RP), whereby the front and rear wheels (FW, RW) are driven as described above.

A description is subsequently given of the above hydraulic continuously variable transmission (CVT) with reference to FIG. 1 and FIGS. 6 to 8. The hydraulic continuously variable transmission (CVT) has the swash plate plunger type hydraulic pump (P) and the swash plate plunger type hydraulic motor (M), and the transmission output shaft 6 extends through the hydraulic continuously variable transmission (CVT) passing the center thereof. The transmission output shaft 6 is supported in a transmission housing (HSG) such that it can turn by ball bearings 7a and 7b.

The hydraulic pump (P) comprises a pump casing 20 which is mounted to the transmission output shaft 6 in such a manner that it is coaxial to and rotated relative to the transmission output shaft 6, a pump swash plate member 21 which is installed in the pump casing 20 and inclined at a predetermined angle from the rotation axis of the pump casing 20, a pump cylinder 22 which is opposed to the pump swash plate member 21, and a plurality of pump plungers 23 which are slidably laid in a plurality of pump plunger holes 22a formed in the axial direction and arranged in a loop surrounding the center axis of the pump cylinder 22. The pump casing 20 is supported on the transmission output shaft 6 such that it can turn by a bearing 8a and also supported in the transmission housing (HSG) such that it can turn by a bearing 8b. The pump swash plate member 21 is installed in the pump casing 20 in such a manner that it can turn on an axis inclined at the above predetermined angle by bearings 24 and 21b. The pump cylinder 22 is supported in the pump casing 20 in such a manner that it can turn by a bearing 22c relative to and coaxial to the pump casing 20.

The input slave gear 5 is fitted onto the pump casing 20 by fastening a bolt 5a. The outer end portion of each of the pump plungers 23 projects outward and is contacted to and engaged with the swash plate face 21a of the pump swash plate member 21, and the inner end portion situated in the pump plunger hole 22a is opposed to the valve body 51 of a distributor valve 50 (which will be described hereinafter) to form a pump oil chamber 23a in the pump plunger hole 22a. A pump opening 22b which serves as the outlet and inlet of the pump is formed at the end of the pump plunger hole 22a. When the input slave gear 5 is turned, the pump casing 20 is turned as described above, the pump swash plate member 21 situated in the pump casing 20 is moved by the rotation of the pump casing 20, and the pump plungers 23 are reciprocated in the pump plunger holes 22a by the movement of the swash plate faces 21a to compress or expand hydraulic oil in the pump oil chambers 23a.

The hydraulic motor M comprises a motor casing 30 which is connected to the transmission housing (HSG) to be fixed and held, a motor rolling member 35 which is in sliding contact with a support spherical face 30b formed on the inner wall of the motor casing 30 and supported such that it can turn with the center O extending in a direction (vertical direction to the sheet of the figure) perpendicular to the center axis of the transmission output shaft 6 as the center, a motor swash plate member 31 supported in the motor rolling member 35 such that it can turn by bearings 34 and 31b, a motor cylinder 32 opposed to the motor swash plate member 31, and a plurality of motor plungers 33 which are slidably laid in a plurality of motor plunger holes 32a formed in the axial direction and arranged in a loop surrounding the center axis of the motor cylinder 32. The motor cylinder 32 is supported in the motor casing 30 by a bearing 32c such that it can turn.

The outer end portion of each of the motor plungers 33 projects outward and is contacted to and engaged with the swash plate face 31a of the motor swash plate member 31, and the inner end portion situated in the plunger hole 32a is opposed to the valve body 51 to form a motor oil chamber 33a in the motor plunger hole 32a. A motor opening 32b which serves as the outlet and inlet of the motor is formed at the end of the motor plunger hole 32a. An arm portion 35a which projects outward from the end of the motor rolling member 35 in the radial direction is connected to a motor servo mechanism (SV) which controls the horizontal movement in the figure of the arm portion 35a to carry out the control of the revolution on the center O of the motor rolling member 35. When the motor rolling member 35 is turned, the motor swash plate member 31 which is rotatably supported in the motor rolling member 35 is also turned and the angle of its swash plate is changed.

The distributor valve 50 is provided between the pump cylinder 22 and the motor cylinder 32. The valve body 51 of the distributor valve 50 is sandwiched between and integrally connected to the pump cylinder 22 and the motor cylinder 32 and also connected to the transmission output shaft 6. Therefore, the pump cylinder 22, distributor valve 50, motor cylinder 32 and transmission output shaft 6 turn together.

Figure 7:
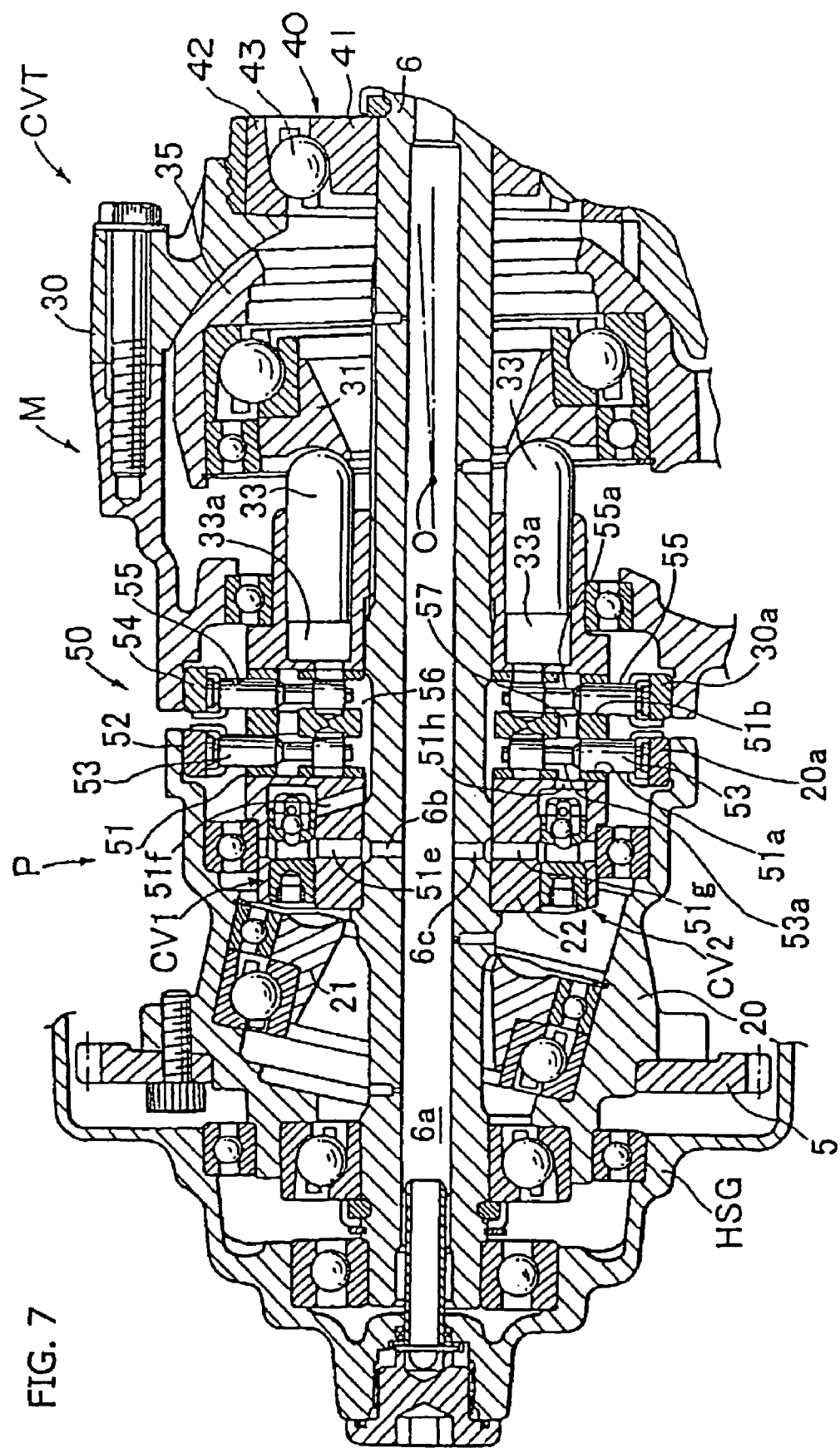
FIG. 7 is a sectional view of part of the above hydraulic continuously variable transmission according to an embodiment of the present invention.

To show reference symbols clearly in FIG. 7 in particular, a plurality of pump-side spool holes 51a and a plurality of motor-side spool holes 51b extending in the radial direction are formed in two rows in the valve body 51 constituting the distributor valve 50 at equal intervals in the circumferential direction. Pump-side spools 53 are slidably laid in the pump-side spool holes 51a, and motor-side spools 55 are slidably laid in the motor-side spool holes 51b.

The pump-side spool holes 51a are formed corresponding to the pump plunger holes 22a, and a plurality of pump-side communication paths 51c communicating with the respective pump openings 22b (pump oil chambers 23a) and the respective pump-side spool holes 51a are formed in the valve body 51. The motor-side spool holes 51b are formed corresponding to the motor plunger holes 32a, and a plurality of motor-side communication paths 51d communicating with the respective motor openings 32b (motor oil chambers 33a) and the respective motor-side spool holes 51b are formed in the valve body 51 (see FIG. 1).

In the distributor valve 50, a pump-side cam ring 52 is disposed at a position surrounding the outer ends of the pump-side spools 53, and a motor-side cam ring 54 is disposed at a position surrounding the outer ends of the motor-side spools 55. The pump-side cam ring 52 is mounted on the eccentric inner face 20a formed eccentric to the center axis of the rotation of the pump casing 20 on the inner wall at the end of the pump casing 20 so that it is turned together with the pump casing 20. The motor-side cam ring 54 is mounted on the eccentric inner face 30a formed eccentric to the center axis of the rotation of the motor cylinder 32 on the inner wall at the end of the motor casing 30. The outer ends of the pump-side spools 53 are secured to the inner wall of the pump-side cam ring 52 in such a manner that they can turn relative to the pump-side cam ring 52, and the outer ends of the motor-side spools 55 are secured to the inner wall of the motor-side cam ring 54 in such a manner that they can turn relative to the motor-side cam ring 54.

An inner path 56 is formed between the inner wall of the valve body 51 and the outer wall of the transmission output shaft 6, and the inner ends of the pump-side spool holes 51 and the motor-side spool holes 51b communicate with this inner path 56. An outer path 57 which communicates with the pump-side spool holes 51a and the motor-side spool holes 51b is formed in the valve body 51.

A description is subsequently given of the operation of the above constituted distributor valve 50. When the drive force of the engine (E) is transmitted to the input slave gear 5 to turn the pump casing 20, the pump swash plate member 21 is rolled by this revolution. Therefore, the pump plungers 23 which are contacted to and engaged with the swash plate faces 21a of the pump swash plate member 21 are reciprocated in the axial direction in the respective pump plunger holes 22a by the rolling of the pump swash plate member 21, and hydraulic oil is discharged from the pump oil chambers 23a through the pump openings 22b by the inward movements of the pump plungers 23 and absorbed into the pump chambers 23a through the pump openings 22b by the outward movements of the pump plungers 23.

Although the pump-side cam ring 52 mounted to the end of the pump casing 20 is turned together with the pump casing 20, the pump-side spools 53 are reciprocated in the radial direction in the respective pump-side spool holes 51a by the revolution of the pump-side cam ring 52 as it is mounted eccentric to the rotation center of the pump casing 20. When the pump-side spools 53 are thus reciprocated and moved to their inner-diameter side as shown in the upper half part of FIG. 1, the pump-side communication paths 51c and the outer path 57 communicate with each other through spool grooves 53a and when the pump-side spools 53 are moved to their outer-diameter side as shown in the lower half part of FIG. 1, the pump-side communication paths 51c and the inner path 56 communicate with each other through the spool grooves 53a.

When the swash plate member 21 is rolled by the revolution of the pump casing 20 to reciprocate the pump plungers 23, the position of eccentricity is set such that the pump-side cam ring 52 moves the pump-side spools 53 to their inner-diameter side during the half round of the pump casing 20 during which the pump plungers 23 are moved from a position where they are pushed the most outward (to be referred to as "lower dead center") to a position where they are pushed the most inward (to be referred to as "upper dead center") and to their outer-diameter side during the half round of the pump casing 20 during which the pump plungers 23 are moved from the upper dead center to the lower dead center.

As a result, when the pump plungers 23 are moved from the lower dead center to the upper dead center by the revolution of the pump casing 20 to discharge the hydraulic oil in the pump oil chambers 23a from the pump openings 22b, this hydraulic oil is supplied into the outer path 57 through the pump-side communication paths 51c. When the pump plungers 23 are moved from the upper dead center to the lower dead center by the revolution of the pump casing 20, the hydraulic oil in the inner path 56 is absorbed into the pump oil chambers 23a through the pump-side communication paths 51c and the pump openings 22b. As understood from this, when the pump casing 20 is turned, the hydraulic oil discharged from the hydraulic pump (P) is supplied into the outer path 57 where it is supplied to the hydraulic motor (M), and hydraulic oil is absorbed into the hydraulic pump (P) from the inner path 56.

Since the motor-side cam ring 54 attached to the end of the motor casing 30 is also mounted eccentric to the rotation center of the motor casing 30, when the motor cylinder 32 is turned, the motor-side spools 55 are reciprocated in the radial direction in the respective motor-side spool holes 51b by the revolution of the motor cylinder 32. When the motor-side spools 55 are thus reciprocated and moved to their inner-diameter side as shown in the upper half part of FIG. 1, the motor-side communication paths 51d and the outer path 57 communicate with each other through the spool grooves 55a and when the motor-side spools 55 are moved to their outer-diameter side as shown in the lower half part of FIG. 1, the motor-side communication paths 51d and the inner path 56 communicate with each other through the spool grooves 55a.

The hydraulic oil discharged from the hydraulic pump (P) is supplied into the outer path 57 as described above and further the motor oil chambers 33a from the motor-side communication paths 51d through the motor openings 32b, and the motor plungers 33 are pushed outward in the axial direction. The outer ends of the motor plungers 33 which receive outward pressure in the axial direction are slidably contacted to a portion from the upper dead center to the lower dead center of the motor swash plate member 31 while the motor rolling member 35 is rolled as shown in FIG. 1. The motor cylinder 32 is turned so that the motor plungers 33 are moved from the upper dead center to the lower dead center along with the motor swash plate member 31 by this outward pressure in the axial direction.

To carry out this revolution, the position of eccentricity of the motor-side cam ring 54 is set such that when the motor plungers 33 are reciprocated along with the inclination of the motor swash plate member 31 by the revolution of the motor cylinder 32, the motor-side cam ring 54 moves the motor-side spools 55 to their outer-diameter side during the half round of the motor cylinder 32 during which the motor plungers 33 are moved from a position (lower dead center) where they are pushed the most outward to a position where they are pushed the most inward (upper dead center) and to their outer-diameter side during the half round of the motor cylinder 32 during which the motor plungers 33 are moved from the upper dead center to the lower dead center.

When the motor cylinder 32 is thus turned, the motor plungers 33 are pushed inward while they are moved from the lower dead center to the upper dead center along with the motor swash plate member 31 by this revolution, and hydraulic oil in the motor oil chambers 33a is supplied into the inner path 56 from the motor openings 32b through the motor-side communication paths 51d. Thus, hydraulic oil supplied into the inner path 56 is absorbed into the pump oil chambers 23a through the pump-side communication paths 51c and the pump openings 22b as described above.

As understood from the above description, when the pump casing 20 is turned by the driving torque of the engine (E), hydraulic oil is discharged into the outer path 57 from the hydraulic pump (P) and supplied into the hydraulic motor (M) to turn the motor cylinder 32. The hydraulic oil which has turned the motor cylinder 32 is supplied into the inner path 56 and absorbed into the hydraulic pump (P) from the inner path 56. Thus, a closed hydraulic circuit for connecting the hydraulic pump (P) to the hydraulic motor (M) is composed of the distributor valve 50. Specifically, the hydraulic oil discharged from the hydraulic pump (P) by the revolution of the hydraulic pump (P) is supplied into the hydraulic motor (M) through the closed hydraulic circuit to drive the hydraulic motor (M), and the hydraulic oil discharged by driving the hydraulic motor (M) is returned to the hydraulic pump (P) through the closed hydraulic circuit.

Since the pump cylinder 22 and the motor cylinder 32 are connected to the transmission output shaft 6 and turned together, when the motor cylinder 32 is turned as described above, the pump cylinder 22 is also turned and the revolution speed of the pump casing 20 relative to the pump cylinder 22 becomes low. Therefore, the relationship between the revolution speed Ni of the pump casing 20 and the revolution speed No of the transmission output shaft 6 (that is, the revolution speeds of the pump cylinder 22 and the motor cylinder 32) is expressed by the following equation (1) based on the capacity Vp of the pump and the capacity (Vm) of the motor.

Equation 1

$$Vp(Ni-No)=VmNo \qquad (1)$$

The capacity Vm of the motor can be changed continuously by control for rolling the motor rolling member 35 by means of the motor servo mechanism (SV). Therefore, when the revolution speed Ni of the pump swash plate member 21 is fixed in the above equation (1) and the motor capacity Vm is changed continuously, the control of speed change for changing the revolution of the transmission output shaft 6 is continuously carried out.

When control for reducing the rolling angle of the motor rolling member 35 is carried out, the motor capacity Vm becomes small and when the pump capacity Vp is fixed in the relationship of the above equation (1) and the revolution speed Ni of the pump swash plate member 21 is fixed, control is made to increase the revolution of the transmission output shaft 6 to the revolution speed Ni of the pump swash plate member 21, that is, to change it to the top gear continuously. When the angle of the motor swash plate becomes null, that is, 90°, the change gear ratio (top gear ratio) becomes Ni=No theoretically and the hydraulic locked state is obtained. As a result, the pump casing 20 is turned together with the pump cylinder 22, the motor cylinder 32 and the transmission output shaft 6 to supply mechanical power.

Control for changing the motor capacity continuously is carried out by changing the angle of the motor swash plate by rolling the motor rolling member 35. The motor servo mechanism (SV) for rolling the motor rolling member 35 will be described hereinbelow with reference to FIG. 6 mainly.

The motor servo mechanism (SV) comprises a ball screw shaft 61 which is situated in the vicinity of the arm portion 35a of the motor rolling member 35, extends parallel to the transmission output shaft 6 and is supported in the transmission housing (HSG) such that it can turn by bearings 60a and 60b, and a ball nut 62 which is mated with a male screw 61a formed on the outer wall of the ball screw shaft 61. A ball thread 62a is formed by a plurality of balls which are held on the inner wall of the ball nut 62 by a cage and arranged in a screw form and mated with the male screw 61a. The ball nut 62 is connected to the arm portion 35a of the motor rolling member 35 and moved in a horizontal direction over the ball screw shaft 61 such that the motor rolling member 35 is rolled when the ball screw shaft 61 is turned.

To drive the ball screw shaft 61 as described above, a swash plate control motor (electric motor) 67 is attached to the outer end face of the transmission housing (HSG). The drive shaft 67a of the swash plate control motor 67 is connected to a spacer shaft 65 by a coupling 66. This spacer shaft 65 extends beyond the periphery of the input slave gear 5 close to the end portion of the above ball screw shaft 61 and parallel to the transmission output shaft 6 in the transmission housing (HSG) and is rotatably supported in the transmission housing (HSG). An idle shaft 64*c* which extends parallel to the spacer shaft 65 is supported in the transmission housing (HSG), and an idle gear member 64 is rotatably mounted on this idle shaft 64*c*.

A first gear 65*a* is formed at the end of the spacer shaft 65 and engages with a second gear 64*b* formed integrated with the idle gear member 64. A third gear 64*a* formed integrated with the idle gear member 64 engages with a fourth gear 63 which is fitted onto the end of the above ball screw shaft 61. Therefore, when the drive shaft 67*a* is turned by controlling the revolution of the swash plate control motor 67, this revolution is transmitted to the fourth gear member 63 through the idle gear member 64 to turn the ball screw shaft 61, and the ball nut 62 is moved in the horizontal direction over the shaft 61 to roll the motor rolling member 35.

When control is made to roll the motor rolling member 35, the actual titling and rolling angle of the motor rolling member 35 is accurately detected and the drive control of the swash plate control motor 67 is carried out based on detection information on the tilting and rolling angle. Therefore, it is important that the actual tilting and rolling angle of the motor rolling member 35 should be detected accurately, and the swash plate tilting angle detector for detecting this angle will be described with reference to FIG. 8.

Figure 8:
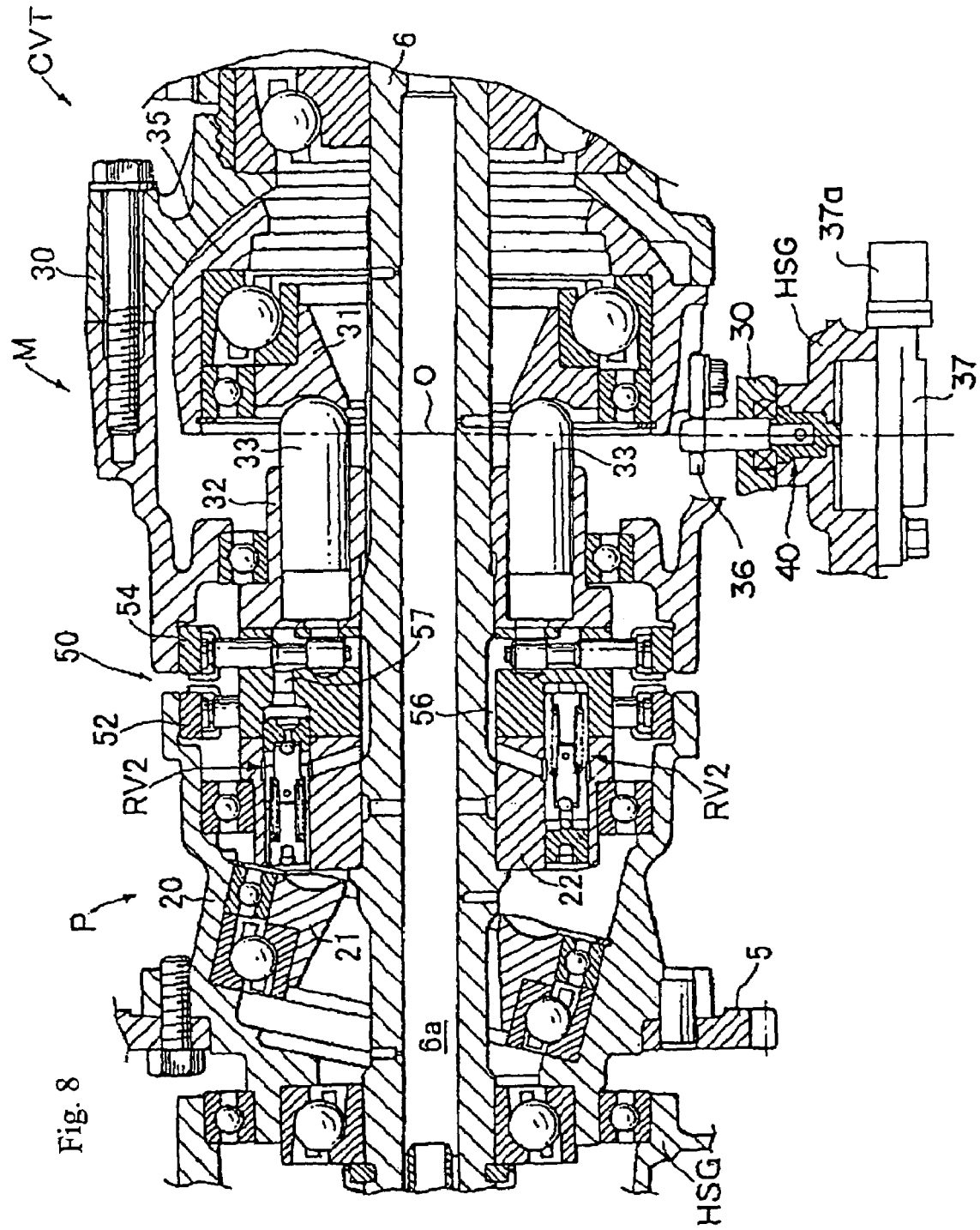
FIG. 8 is an enlarged sectional view of part of the above hydraulic continuously variable transmission according to an embodiment of the present invention.

FIG. 8 is a sectional view of a hydraulic continuously variable transmission (CVT) cut on a plane passing through the center axis O of rolling of the motor rolling member 35 and the center axis of rotation of the transmission output shaft 6. A shaft securing member 36 is fixed to a portion passing through the center axis of rolling at the side end of the motor rolling member 35. An angle detector 37, which is a potentiometer, is mounted to the transmission housing (HSG) and has an electric connector 37*a* for obtaining a detection signal. A rotation connection mechanism 40 is arranged to connect the shaft securing member 36 to the angle detector 37 (detection axis of the detector).

Figure 9:
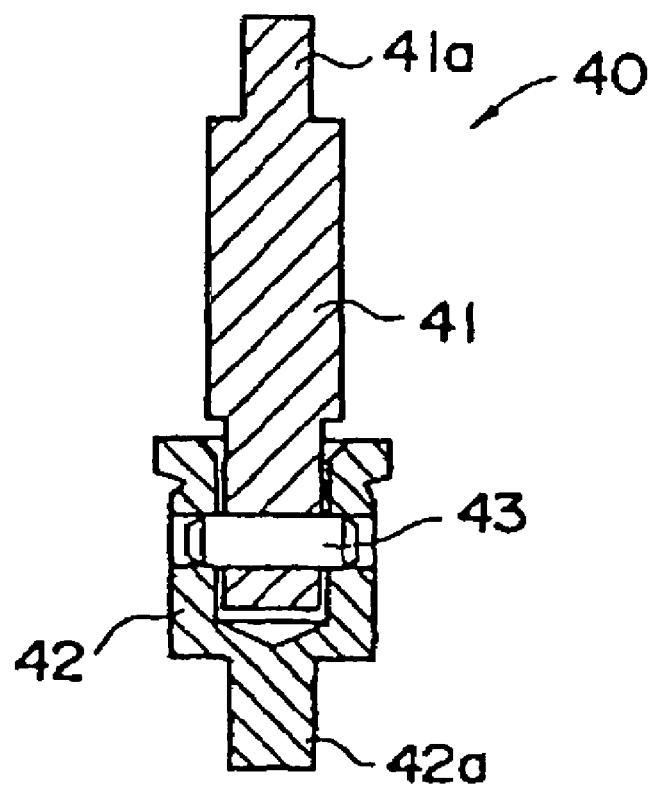
FIG. 9 is a sectional view of a rotation connection mechanism constituting the swash plate tilting angle detector in the hydraulic continuously variable transmission according to an embodiment of the present invention.

This rotation connection mechanism 40 is shown in FIG. 9 and comprises a first connection rod 41 having an engagement portion 41*a* to be engaged with the shaft securing member 36 and a second connection rod 42 having an engaging portion 42*a* to be engaged with the angle detector 37 both of which are connected by a pin 43 in such a manner that they can move as shown in FIG. 9. This pin 43 is somewhat loosely connected or fitted so that the second connection rod 42 can move or pivot relative to the first connection rod 41 at an angle. A universal joint mechanism such as a spherical joint may be used in place of the pin 43. Further, a flexible rod or a shaft member (such as a rubber tube) may be used as the rotation connection mechanism. Particularly when the rotation connection mechanism is a universal joint, if the second connection rod 42 is greatly inclined with respect to the first connection rod 41, revolution will still be transmitted and detected accurately. Therefore, when the angle detector 37 is to be mounted to the casing, the restriction of its installation position and angle is small and the degree of lay-out freedom is high.

The first connection rod 41 of the rotation connection mechanism 40 is engaged with the shaft securing member 36 and turned by the rolling of the motor rolling member 35, the second connection rod 42 is connected to the first connection rod 41 by the pin 43 to be turned together with the first connection rod 41 so as to transmit this revolution to the angle detector 37, whereby the rolling angle of the motor rolling member 35, that is, the swash plate angle of the motor swash plate 31 is detected. Since the inclination of the second connection rod 42 with respect to the first connection rod 41 to a certain degree is allowed, even when the center of the detection axis of the angle detector 37 mounted to the transmission housing (HSG) is slightly inclined with respect to the center axis O of tilting and rolling of the motor rolling member 35, the tilting and rolling of the motor rolling member 35 are transmitted to the angle detector 37 accurately and smoothly, thereby making it possible to accurately detect the tilting and rolling angle (the angle of the swash plate). Since the installation position accuracy of the angle detector 37 may be slightly low, the degree of lay-out freedom of the angle detector 37 is high.

When oil flows through the closed hydraulic circuit to transmit hydraulic force between the hydraulic pump (P) and the hydraulic motor (M) as described above, oil leakage from the hydraulic closing circuit and oil leakage from mating portions between the pump and the motor plunger holes 22*a* and 32*a* and mating portions between the pump and the motor plungers 23 and 33 occur. Therefore, a charge oil supply hole 6*a* extending in the axial direction is formed in the transmission output shaft 6 and connected to a first check valve (CV1) mounted in the pump cylinder 22 through an oil path 6*b* formed in the transmission output shaft 6 and an oil path 51*e* formed in the pump cylinder 22 and further to the inner path 56 from the first check valve (CV1) through an oil path 51*f* as shown in FIG. 7. Therefore, charge oil supplied from an unshown charge oil supply source to the charge oil supply hole 6*a* is supplied into the inner path 56 through the first check valve (CV1) as required.

The charge oil supply hole 6*a* is connected to a second check valve (CV2) mounted in the pump cylinder 22 through an oil path 6*c* formed in the transmission output shaft 6 and an oil path 51*g* formed in the pump cylinder 22 and further to the outer path 57 from the second check valve (CV2) through an oil path 51*h*. Therefore, the charge oil supplied into the charge oil supply hole 6*a* is supplied into the outer path 57 through the second check valve (CV2) as required.

As understood from the description of the operations of the hydraulic pump (P) and the hydraulic motor (M), when the hydraulic motor (M) is in a normal running state, that is, is driven with hydraulic oil from the hydraulic pump (P), the inside pressure of the outer path 57 is high and the inside pressure of the inner path 56 is low, whereby the charge oil is supplied into the innerpath 56 through the first check valve (CV1). However, when the vehicle is running by using engine brake, the inside pressure of the outer path 57 is low and the inside pressure of the inner path 56 is high, whereby charge oil is supplied into the outer path 57 through the second check valve (CV2).

As shown in FIG. 8, first and second relief valves (RV1, RV2) are installed in the pump cylinder 22. The first relief valve (RV1) connects the outer path 57 to the inner path 56. When the pressure of oil in the outer path 57 becomes a predetermined level or higher, the first relief valve is opened to discharge oil into the inner path 56, thereby preventing the pressure of oil in the outer path 57 from becoming too high. The second relief valve (RV2) connects the inner path 56 to the outer path 57. When the pressure of oil in the inner path 56 becomes a predetermined level or higher, the second relief valve (RV2) is opened to discharge oil into the outer path 57, thereby preventing the pressure of oil in the inner path 56 from becoming too high.

As described above, according to the present invention, the swash plate tilting angle detector for detecting the tilting and rolling angle of the swash plate comprises an angle detector mounted to a casing and a rotation connection mechanism which has one end situated coaxial to the titling and rolling axis and connected to the swash plate and the other end connected to the angle detector. The rotation connection mechanism is constituted (for example, comprising a first connection rod connected to the swash plate coaxially to the tilting and rolling axis, a second connection rod connected to a rotation detector, and a movable joint for connecting the first connection rod to the second connection rod) such that it can transmit the tilting and rolling angle of the swash plate to the angle detector accurately even when the rotation axis of a portion connected to the rotation connection mechanism of the angle detector is inclined at a predetermined angle with respect to the tilting and rolling axis. Therefore, even when the rolling center of the swash plate and the center of the rotation detection axis of the swash plate angle detector slightly differ from each other, the tilting and rolling angle of the swash plate can be transmitted to the angle detector by the rotation connection mechanism accurately to enable the accurate detection of the angle of the swash plate. Consequently, the conventional necessity of great control for securing the detection accuracy of the swash plate angle detector is eliminated, and it becomes easy to control the detector's installation position.

Although the present invention has been described herein with respect to a specific illustrative embodiment thereof, the foregoing description is intended to be illustrative, and not restrictive. Those skilled in the art will realize that many modifications of the embodiment could be made which would be operable. All such modifications which are within the scope of the claims are intended to be within the scope and spirit of the present invention.

Having thus described the invention, the following is claimed:

1. A swash plate plunger type hydraulic unit comprising:
   a cylinder which is rotatably supported and has a plurality of plunger holes extending in an axial direction and arranged in a loop to surround a rotation axis thereof;
   a plurality of plungers slidably disposed in the respective plunger holes;
   a swash plate to which outer end portions of the plungers are contacted;
   a casing for supporting the swash plate in such a manner that it can tilt and roll with a rolling axis perpendicular to the rotation axis as a center, and housing the swash plate and the cylinder; and
   a swash plate tilting angle detector detecting a tilting and rolling angle of the swash plate;
   the swash plate tilting angle detector comprising an angle detector mounted to the casing and a rotation connection mechanism having one end which is situated coaxial to the rolling axis and contiguously connected to the swash plate, and another end which is connected to the angle detector; and
   the rotation connection mechanism accurately transmits the tilting and rolling angle of the swash plate to the angle detector even when a rotation axis of a portion of the angle detector connected to the rotation connection mechanism is inclined at an angle with respect to the rolling axis,
   wherein the rotation connection mechanism comprises a first connection rod which is connected to the swash plate coaxially to the rolling axis, a second connection rod connected to the rotation detector, and a movable joint connecting the first connection rod to the second connection rod, and wherein the movable joint comprises a pin.

2. A swash plate type hydraulic unit of claim 1, wherein the movable joint comprises one of a universal joint and a pin.

3. A swash plate type hydraulic unit of claim 1, wherein the one end of the rotation connection mechanism is connected to the swash plate through a shaft securing member.

4. A swash plate type hydraulic unit of claim 1, further comprising a rolling member connected to the swash plate and through which the swash plate can tilt and roll with the rolling axis.

5. A swash plate type hydraulic unit of claim 4, wherein the one end of the rotation connection mechanism is connected to the rolling member.

6. A swash plate plunger type hydraulic unit comprising:
   a cylinder which is rotatably supported and has a plurality of plunger holes extending in an axial direction and arranged in a loop to surround a rotation axis thereof;
   a plurality of plungers slidably disposed in the respective plunger holes;
   a swash plate to which outer end portions of the plungers are contacted;
   a casing for supporting the swash plate in such a manner that it can tilt and roll with a rolling axis perpendicular to the rotation axis as a center, and housing the swash plate and the cylinder; and
   a swash plate tilting angle detector detecting a tilting and rolling angle of the swash plate;
   the swash plate tilting angle detector comprising an angle detector mounted to the casing and a rotation connection mechanism having one end which is situated coaxial to the rolling axis and connected to the swash plate and another end which is connected to the angle detector; and
   the rotation connection mechanism includes a first connection rod which is fixed to the swash plate coaxially to the rolling axis, and a second connection rod fixed to the rotation detector and movably connected to the first connection rod, wherein the first and second connection rods are movably connected through one of a universal joint and a pin.

7. A swash plate type hydraulic unit of claim 6, wherein the first and second connection rods are movably connected such that the rotation connection mechanism accurately transmits the tilting and rolling angle of the swash plate to the angle detector even when a rotation axis of a portion of the angle detector connected to the rotation connection mechanism is inclined at an angle with respect to the rolling axis.

8. A swash plate type hydraulic unit of claim 6, wherein the one end of the rotation connection mechanism is connected to the swash plate through a shaft securing member.

9. A swash plate type hydraulic unit of claim 6, further comprising a rolling member connected to the swash plate and through which the swash plate can tilt and roll with the rolling axis.

10. A swash plate type hydraulic unit of claim 9, wherein the one end of the rotation connection mechanism is connected to the rolling member.

11. A swash plate type hydraulic unit of claim 6, wherein the casing for supporting the swash plate is fixed to a transmission housing of a transmission, and wherein the pin is disposed so as to be covered by the housing.

12. The swash plate type hydraulic unit of claim 11, wherein the angle detector includes an electric connector, and the electric connector extends in parallel with the rotation axis of the cylinder.

13. A swash plate plunger type hydraulic unit disposed in a transmission housing, the hydraulic unit comprising:
- a cylinder which is rotatably supported and has a plurality of plunger holes extending in an axial direction and arranged in a loop to surround a rotation axis thereof;
- a plurality of plungers slidably disposed in the respective plunger holes;
- a swash plate to which outer end portions of the plungers are contacted;
- a casing fixed to the transmission housing for supporting the swash plate in such a manner that it can tilt and roll with a rolling axis perpendicular to the rotation axis as a center, and housing the swash plate and the cylinder; and
- a swash plate tilting angle detector detecting a tilting and rolling angle of the swash plate;
- the swash plate tilting angle detector comprising an angle detector mounted to the casing and a rotation connection mechanism having one end which is situated coaxial to the rolling axis and connected to the swash plate, and another end which is connected to the angle detector; and
- the rotation connection mechanism accurately transmits the tilting and rolling angle of the swash plate to the angle detector even when a rotation axis of a portion of the angle detector connected to the rotation connection mechanism is inclined at an angle with respect to the rolling axis,
- wherein the rotation connection mechanism comprises a first connection rod which is connected to the swash plate coaxially to the rolling axis, a second connection rod connected to the rotation detector, and a movable joint connecting the first connection rod to the second connection rod, and
- wherein the movable joint comprises a pin, and the pin is disposed so as to be surrounded by the transmission housing.

14. The swash plate hydraulic unit of claim 13, wherein the angle detector includes an electric connector, and the electric connector extends in parallel with the rotation axis of the cylinder.

* * * * *